US012502681B2

(12) United States Patent
Terada

(10) Patent No.: US 12,502,681 B2
(45) Date of Patent: Dec. 23, 2025

(54) ROTARY ATOMIZING HEAD-TYPE SPRAYER AND ELECTROSTATIC PAINTING APPARATUS

(71) Applicant: ABB SCHWEIZ AG, Baden (CH)

(72) Inventor: Masaru Terada, Tokyo (JP)

(73) Assignee: ABB SCHWEIZ AG, Baden (CH)

(*) Notice: Subject to any disclaimer, the term of this patent is extended or adjusted under 35 U.S.C. 154(b) by 344 days.

(21) Appl. No.: 18/364,793

(22) Filed: Aug. 3, 2023

(65) Prior Publication Data

US 2024/0050965 A1 Feb. 15, 2024

(30) Foreign Application Priority Data

Aug. 10, 2022 (JP) ................................ 2022-127520
May 15, 2023 (JP) ................................ 2023-080138

(51) Int. Cl.
*B05B 5/04* (2006.01)
*B05B 12/18* (2018.01)

(52) U.S. Cl.
CPC .......... *B05B 5/0426* (2013.01); *B05B 5/0407* (2013.01); *B05B 12/18* (2018.02)

(58) Field of Classification Search
CPC ..... B05B 5/0426; B05B 5/0407; B05B 12/18; B05B 5/04; B05B 5/0418; B05B 5/0533; B05B 3/1064; B05B 3/1092
See application file for complete search history.

(56) References Cited

U.S. PATENT DOCUMENTS

2009/0020626 A1* 1/2009 Seitz .................... B05B 3/1014 239/338
2011/0086166 A1* 4/2011 Fischer .................. C23C 16/06 427/248.1
2016/0059248 A1* 3/2016 Yamauchi ............ B05B 5/0426 239/296

FOREIGN PATENT DOCUMENTS

JP 2003236417 A 8/2003

* cited by examiner

*Primary Examiner* — Steven M Cernoch
(74) *Attorney, Agent, or Firm* — GREENBERG TRAURIG, LLP

(57) ABSTRACT

Inner cylinder surface of shaping air ring may be formed to a uniform inner diameter dimension. After first shaping air discharge unit has been formed as an annular gap, the gap dimension may be set to 0.1 to 1.0 mm. Front end of shaping air ring is positioned 0.1 to 10.0 mm from discharge edge of rotary atomizing head. The radial width dimension of front end is set to 2 mm or less. Front outer cylinder surface of shaping air ring has a taper angle β of 25° or less in relation to the axis line O-O, expanding toward the rear side.

5 Claims, 8 Drawing Sheets

ROTARY ATOMIZING HEAD-TYPE SPRAYER AND ELECTROSTATIC PAINTING APPARATUS

CROSS-REFERENCE TO RELATED APPLICATIONS

This is a non-provisional application claiming priority to Japanese patent application Serial No.: 2023-080138, filed on May 15, 2023, and Japanese patent application Serial No.: 2022-127520, filed on Aug. 10, 2022; which are herein incorporated by reference in their entirety.

TECHNICAL FIELD

The present invention relates to a rotary atomizing head-type sprayer suitable for applying a coating to the body of an automobile.

BACKGROUND ART

In general, when coating automobile bodies, rotary atomizing head-type sprayers that boast good coating efficiency for the coating material and a good coating finish may be used. This rotary atomizing head-type sprayer is equipped with an air motor that is powered by compressed air, a hollow rotary axis that may be rotatably supported along the axis line of the air motor extending in the front-back direction and of which the front end protrudes from the air motor, a feed tube that extends through the rotary axis to the front end of the rotary axis, a rotary atomizing head that is mounted on the front end of the rotary axis and that has an outer circumferential surface that expands into a cup shape as well as an inner circumferential surface to diffuse the coating material supplied from the feed tube with a discharge edge located at the front end to discharge the coating material, a cylindrical shaping air ring that is mounted on the outer circumferential surface of the rotary atomizing head, a first shaping air jetting part that is provided on the outer circumferential surface of the rotary atomizing head to discharge the first shaping air from the discharge edge toward the discharged coating material, and a second shaping air jetting unit that is positioned on the outer side of the first shaping air jetting unit in the radial direction and that surrounds the rotary atomizing head in order to discharge the second shaping air from the discharge edge toward the discharged coating material (Patent Literature 1).

Coating using a rotary atomizing head-type sprayer is expected to reduce the amount of coating material used by improving the coating efficiency on the object to be coated, reduce the carbon dioxide emissions by simplifying the coating booth and other facilities, and reduce the maintenance costs for the coating booth, etc.

Also, in the coating process using a rotary atomizing head-type sprayer, high voltage is applied to the coating material, and electrostatic coating is performed by causing the charged coating material particles to fly along the lines of electric force formed between the coating material particles and the object to be coated. In this electrostatic coating process, the coating distance from the rotary atomizing head-type sprayer (rotary atomizing head) to the object to be coated may be set in consideration of the safe distance for the high voltage, etc. Further, the first shaping air is jetted from the first shaping air jetting unit toward the coating material particles discharged from the discharge edge of the rotary atomizing head, and the second shaping air is jetted from the second shaping air jetting unit. As a result, the coating material particles sprayed from the rotary atomizing head become rectified and are formed into a spray pattern that provides a uniform film thickness distribution.

However, at coating distances that take into account the safety distance for the high voltage, the straightness of the coating material particles due to the shaping air is reduced and the electric field strength is also reduced. This causes the coating material particles to be carried over a wide area by the air flow over the surface of the object to be coated and the material will not reach the object to be coated (surface to be coated), resulting in a decrease in the coating efficiency.

Therefore, it is believed that the flow rate of the shaping air could be increased, but in this case, the number of coating material particles flowing along the surface of the object to be coated would increase. As a result, the coating material particles discharged from the rotary atomizing head are affected by the turbulence created by the shaping air, and induced by the turbulent flow, cannot reach the object to be coated, which results in a decrease in the coating efficiency.

Further, as a countermeasure to achieve high coating efficiency, there is a method to shorten the coating distance (this may be referred to as the "close-distance coating," or "close proximity coating," etc.). This method improves the straightness of the coating material particles transported by the shaping air and increases the electric field strength, thereby improving the coating efficiency. However, the truth of the current situation is that the object to be coated could not be reached due to the effects of the centrifugal forces caused by the rotation of the rotary atomizing head for some of the coating material particles sprayed from the rotary atomizing head, the fact that the material is jetted in the radial direction of the rotary atomizing head, and the fact that the material may be caught in the turbulence of the shaping air jetted from the rear of the rotary atomizing head.

PRIOR ART LITERATURE

Patent Literature (Patent Literature 1) Japanese Unexamined Patent Application Publication 2003-236417

OUTLINE OF THE INVENTION

Problem to be Solved by the Invention

Based on the above-mentioned issues, in order to significantly reduce the amount of coating material particles that fail to reach the object to be coated, which is a factor that may reduce the coating efficiency, first, the electric field intensity may be increased by shortening the coating distance. Second, the coating conditions may be changed in order to reduce the scattering of the coating material particles (e.g., lower the rotational speed of the rotary atomizing head, reduce the shaping air flow rate, or reduce the flow rate of the coating material), etc.

First, there is a problem that if the electric field intensity is increased by shortening the coating distance, the coating efficiency for the object to be coated will be improved, but the shaping air turbulence will remain, and the object to be coated will not be reached because the coating material particles will be scattered around the object.

Next, if the coating conditions, such as for example, the rotational speed of the rotary atomizing head is reduced too much or the shaping air flow rate is reduced too much in order to reduce the scattering of coating material particles, the particle size of the coating material sprayed from the rotary atomizing head will tend to increase, and the quality of the coating (coating film) will degrade. On the other hand, in order to reduce the size of the coating material particles, the viscosity of the coating material can be reduced. However, when the viscosity of the coating material is lowered, the coating film tends to drip easily, making adjustment of the coating material very difficult. Also, when the flow rate of the coating material is reduced, the width of the spray pattern of the coating material becomes smaller, resulting in a decrease in productivity per coating machine.

The present invention was developed in view of the above-mentioned problems of the prior art, and the aims to provide a rotary atomizing head-type sprayer that can improve coating efficiency while maintaining productivity per coating machine without changing the coating conditions such as rotational speed of the rotary atomizing head, shaping air, or coating material flow rate, etc.

Means for Solving the Problem

The present invention is a rotary atomizing head-type sprayer that is equipped with an air motor that is powered by compressed air, a hollow rotary axis that may be rotatably supported along the axis line of said air motor extending in the front-back direction and of which the front end protrudes from said air motor, a feed tube that extends through said rotary axis to said front end of said rotary axis, a rotary atomizing head that is mounted on said front end of said rotary axis and that has an outer circumferential surface that expands into a cup shape as well as an inner circumferential surface to diffuse the coating material supplied from said feed tube with a discharge edge located at the front end to discharge the coating material, a cylindrical shaping air ring that is mounted on the outer circumferential surface of said rotary atomizing head, a first shaping air jetting part that is provided on the outer circumferential surface of said rotary atomizing head to discharge the first shaping air from said discharge edge toward the discharged coating material, and a second shaping air jetting unit that is positioned on the outer side of said first shaping air jetting unit in the radial direction and that surrounds said rotary atomizing head in order to discharge the second shaping air from said discharge edge toward the discharged coating material, wherein the inner cylinder surface of said shaping air ring is formed to have internal diameter dimensions that are uniform at least on the front side portion facing said outer circumferential surface of said rotary atomizing head, said first shaping air jetting unit is formed as a ring gap between said outer circumferential surface of said rotary atomizing head and said inner cylinder surface of said shaping air ring, the radial gap dimension between said outer circumferential surface of said rotary atomizing head and said inner cylinder surface of said shaping air ring is set to 0.1~1.0 mm, the front end of said shaping air ring is placed at a position of 0.1~10.0 mm to the back side from said discharge edge of said rotary atomizing head, the width dimension in the radial direction of said front end of said shaping air ring is set to 2 mm or less, and the outer circumferential surface of said shaping air ring has a taper angle that expands toward the back side from said front end of said shaping air ring that has been set to 25° or less in relation to said axis.

Effect of the Invention

According to the present invention, it will be possible to optimize the coating conditions in order to maintain productivity per coating machine without excessively lowering the rotational speed of the rotary atomizing head or excessively reducing the flow rate of the shaping air, coating material, etc., thereby improving the coating efficiency.

EXAMPLES OF EMBODIMENT OF THE INVENTION

The rotary atomized head-type sprayer and electrostatic painting apparatus according to the examples of embodiment of the present invention will be described in detail below in accordance with the accompanying figures.

FIGS. 1 through 4 show the first example of embodiment of the present invention. There are two types of rotary atomizing head-type sprayers: electrostatic coating machines that apply a coating by applying high voltage to the coating material to be atomized, and non-electrostatic coating machines that apply a coating without applying high voltage to the coating material. In the example of embodiment to be described hereinafter, a rotary atomizing head-type sprayer that has been constructed as a direct-charging electrostatic coating machine that directly applies high voltage to the coating material will be described as an example. Even when applied to a non-electrostatic coating machine, the same effect can be obtained in terms of the shaping air flow.

Figure 1:
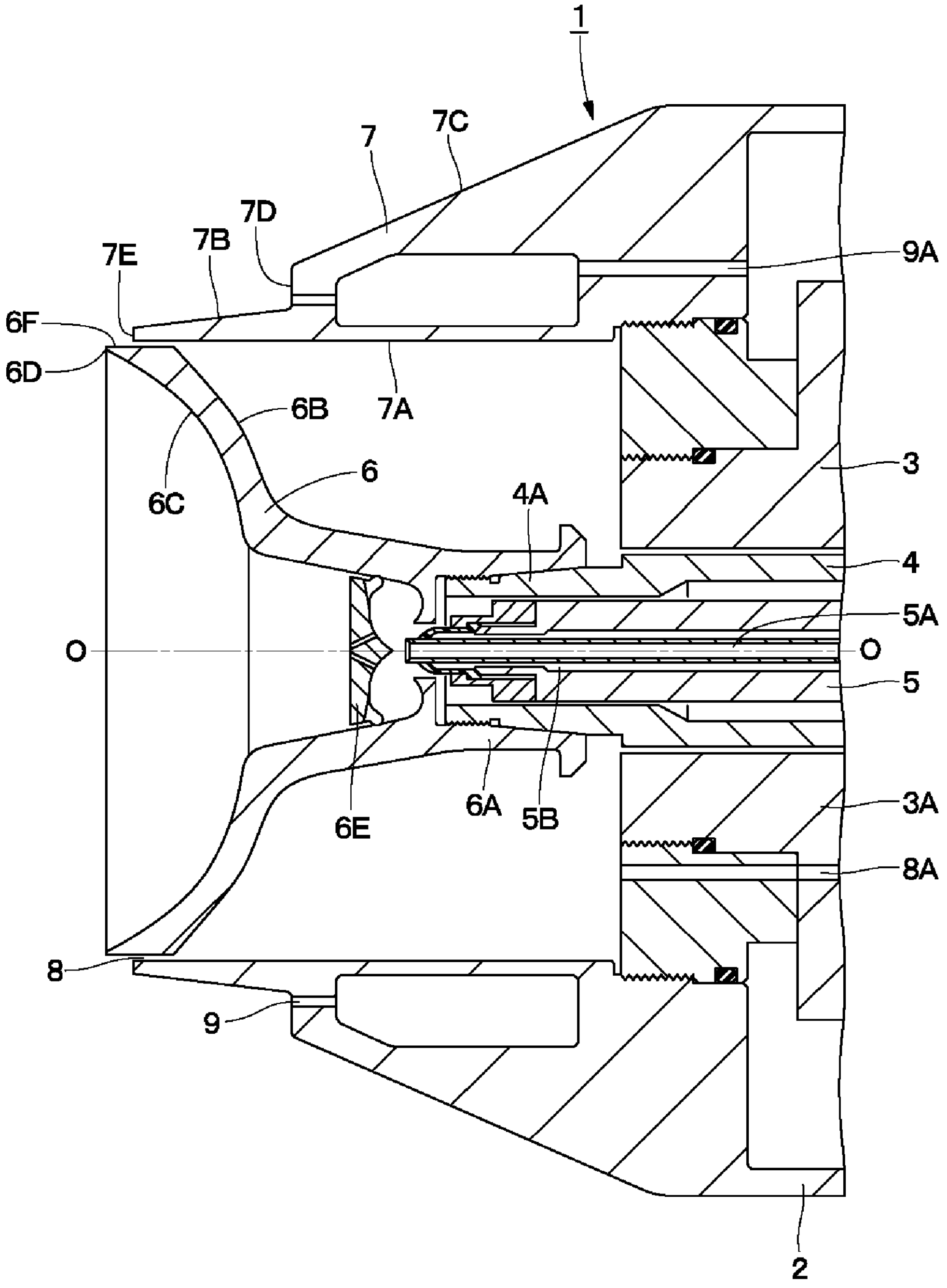
FIG. 1 This is a cross-sectional view showing the rotary atomizing head-type sprayer according to the first example of embodiment of the present invention.

In FIG. 1, rotary atomizing head-type sprayer 1 pertaining to the example of embodiment of the present invention is constructed as a direct-charging electrostatic coating machine in which a high voltage is directly applied to the coating material by a high-voltage generator (not shown in the figure). Rotary atomizing head-type sprayer 1 may be mounted, for example, to the end of a robot arm (not shown in the figure) for coating. Rotary atomizing head-type sprayer 1 consists of housing 2, air motor 3, rotary axis 4, feed tube 5, rotary atomizing head 6, shaping air ring 7, first shaping air jetting unit 8, and second shaping air jetting unit 9, to be described later.

Housing 2 is formed as a cylindrical body and may be mounted to the end of the arm of the robot for coating. On the inner circumference of housing 2, a motor housing (not shown in the figure) for housing air motor 3 opens toward the front. Here, the motor housing consists of a circular stepped hole with an axis line O-O that extends in the front-back direction at its center. This axis line O-O is the rotary axis (central axis) of air motor 3, rotary axis 4, and rotary atomizing head 6. Further, shaping air ring 7 is provided on the front side of housing 2.

Air motor 3 is provided in housing 2 on axis line O-O. Air motor 3 is powered by compressed air to rotate the rotary axis 4 and rotary atomizing head 6 at high speeds of, for example, 3 k to 150 k rpm. Air motor 3 has a stepped cylindrical motor case 3A that is mounted in the motor housing of housing 2, a turbine that is rotatably mounted on the rear side of motor case 3A, and an air bearing (neither of these are shown in the figure) mounted in motor case 3A that supports rotary axis 4. The turbine's rotational speed, i.e., the rotational speed of rotary atomizing head 6, may be controlled by the flow rate of the turbine air that is supplied.

Rotary axis 4 extends in the front-back direction coaxially with the axis line O-O of air motor 3, and is supported such that it may freely rotate via an air bearing. Rotary axis 4 is formed as a hollow cylindrical body, with the rear part mounted integrally in the center of the turbine and with front 4A protruding from motor case 3A. Rotary atomizing head 6 is mounted on front 4A of rotary axis 4.

Feed tube 5 extends through rotary axis 4 to front 4A of rotary axis 4. The front side of feed tube 5 protrudes from front 4A of rotary axis 4 and extends into rotary atomizing head 6. The rear side of feed tube 5 is fixedly mounted in the central position of housing 2.

Feed tube 5 is formed as a coaxially-arranged double tube. The central flow path of this double tube is coating material flow path 5A, and the outer circular flow path is cleaning fluid flow path 5B. Also, coating material flow path 5A and cleaning fluid flow path 5B are connected to the supply source (not shown in the figure) of the coating material and cleaning fluid (such as thinner or air, etc.). As a result, feed tube 5 supplies the coating material from coating material flow path 5A to rotary atomizing head 6 when coating work is performed. On the other hand, feed tube 5 supplies the cleaning fluid from cleaning fluid flow path 5B to rotary atomizing head 6 when cleaning the adhered coating material. Moreover, the feed tube may be configured to use one flow path for both the coating material and the cleaning fluid, switching between these.

Rotary atomizing head 6 micronizes and sprays the paint supplied from feed tube 5. Rotary atomizing head 6 has a rear side mounting part 6A mounted on front 4A of rotary axis 4. Rotary atomizing head 6 may be rotated at high speed with rotary axis 4 by air motor 3.

Rotary atomizing head 6 is equipped with outer circumferential surface 6B that expands in a cup shape from mounting portion 6A toward the front, and inner circumferential surface 6C that expands in a funnel shape toward the front to form a coating material thinning surface that can diffuse the coating material supplied from feed tube 5 while thinning this material. Also, the front end of inner circumferential surface 6C has discharge edge 6D that discharges the coating material that was diffused on inner circumferential surface 6C during the rotation of rotary atomizing head 6.

On the other hand, inside rotary atomizing head 6, disk-shaped hub member 6E is provided on inner circumferential surface 6C (close to mounting portion 6A). This hub member 6E can smoothly guide the coating material supplied from feed tube 5 to inner circumferential surface 6C. Further, front side portion 6F on discharge edge 6D side of outer circumferential surface 6B of rotary atomizing head 6 faces inner cylinder surface 7A of shaping air ring 7, to be described later, in the radial direction.

Figure 2:
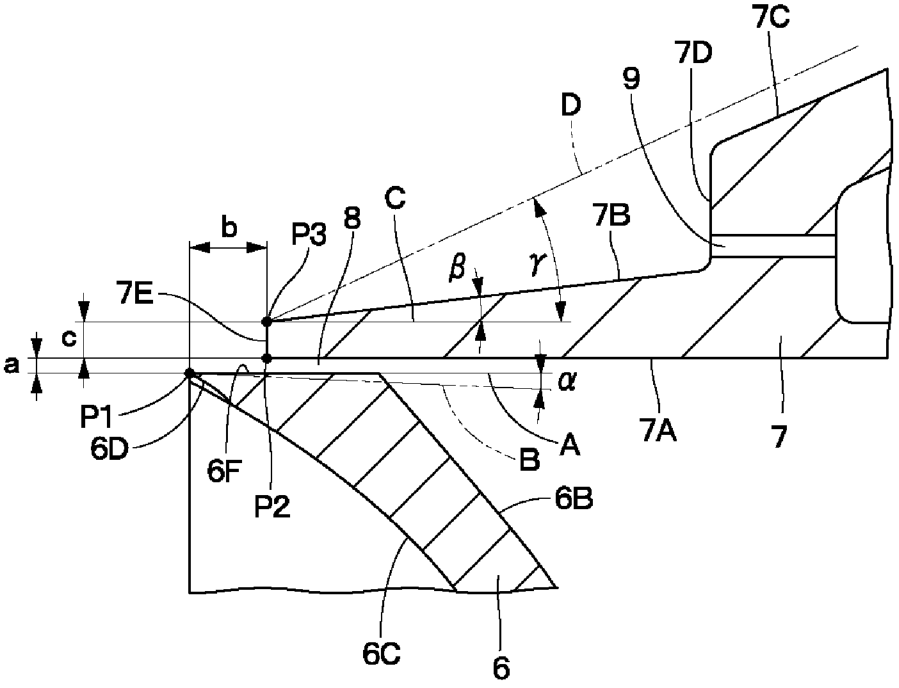
FIG. 2 This is a cross-sectional view showing an enlargement of the dimensions of each part.
Figure 3:
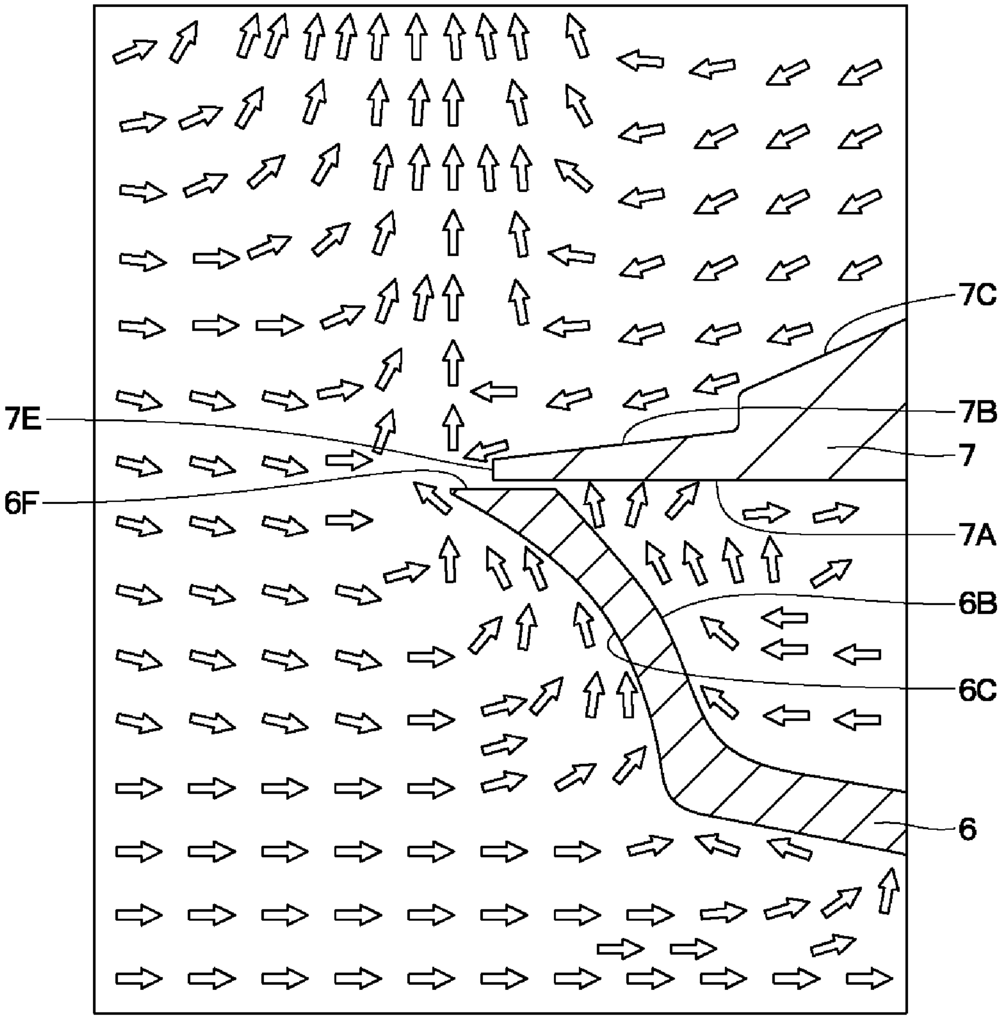
FIG. 3 This is an explanatory diagram that shows the flow of air when the width dimension of the front end of the shaping air ring is set to 2 mm or less.

Next, the shape of front side portion 6F of rotary atomizing head 6 will be described in detail. As shown in FIG. 2, it is preferable for the shape of front side portion 6F to have a uniform outer diameter in the front-back direction (the gap dimension with inner cylinder surface 7A of shaping air ring 7 is constant). In this case, if the boundary position of front side portion 6F with discharge edge 6D, which is the front end, is set at point P1, it is preferable for front side portion 6F to be formed along a straight line A extending parallel to axis line O-O through this point P1. On the other hand, front side portion 6F is allowed to tilt (taper shape) in the direction to reduce the diameter toward the rear side within a specified angle range. More specifically, straight line B (double-dashed line) tilted through point P1 is set to angle $\alpha$ that is no greater than 10° in relation to straight line A. In other words, angle $\alpha$ of front side portion 6F in the direction of to reduce the diameter from discharge edge 6D toward the rear side is set as shown in the following Mathematical Formula 1.

$$0° \leq \alpha \leq 10° \quad \text{[Mathematical Formula 1]}$$

Rotary atomizing head 6 is supplied with coating material from feed tube 5 while being rotated at high speed by air motor 3. Rotary atomizing head 6 diffuses the coating material while thinning it on inner circumferential surface 6C (coating material thinning surface), and atomizes the material using the centrifugal force from discharge edge 6D to spray the material as numerous atomized coating material particles.

Shaping air ring 7 is provided on the outer circumferential surface of rotary atomizing head 6. Shaping air ring 7 is formed in a stepped cylindrical shape and is provided on the front side of housing 2 such that it surrounds rotary atomizing head 6. Shaping air ring 7 consists of inner cylinder surface 7A, front outer cylinder surface 7B that is positioned on the front side, rear outer cylinder surface 7C that is positioned on the rear side, step 7D between front outer cylinder surface 7B and rear outer cylinder surface 7C, and front end 7E that is positioned at the forefront.

Inner cylinder surface 7A has an inner diameter that is larger than the outer diameter of outer circumferential surface 6B of rotary atomizing head 6, and is formed as a cylindrical surface of uniform inner diameter extending in the front-back direction with this inner diameter dimension. Inner cylinder surface 7A has a front side portion overlapping outer circumferential surface 6B with a gap along this circumference. Therefore, first shaping air jetting unit 8 described below is formed between outer circumferential surface 6B and inner cylinder surface 7A.

Here, the radial gap dimension between outer circumferential surface 6B of rotary atomizing head 6 and inner cylinder surface 7A of shaping air ring 7 will be described in detail with reference to FIG. 2. This clearance dimension can be expressed as the radial dimension A between this point P2 and point P1 of rotary atomizing head 6 when the corner (border) of inner cylinder surface 7A and front end 7E is point P2. This gap dimension a may be set as shown in the following Mathematical Formula 2.

$$0.1\ \text{mm} \leq a \leq 1.0\ \text{mm} \quad \text{[Mathematical Formula 2]}$$

This allows the jetting port of first shaping air jetting unit 8 to be narrowed down to the gap dimension a, thereby improving the direction and convergence of the first shaping air jetted out from first shaping air jetting unit 8. It should be noted that the first shaping air discharge part may also be formed as a plurality of slits or square holes that are circumferentially connected by providing a plurality of partition plates extending inwardly from the inner cylinder surface of the shaping air ring with circumferential spacing. Even in this case, the inner circumferential surface of the shaping air ring that consists of circumferentially continuous slits or square holes may be formed with a uniform inner diameter dimension for the portion facing the outer circumferential surface of the rotary atomizing head.

Also, front end 7E of shaping air ring 7 (between points P2 and P3) may be positioned on the rear side at dimension b from discharge edge 6D (point P1) of rotary atomizing head 6. This dimension b may be set as shown in the following Mathematical Formula 3.

$$0.1\ \text{mm} \leq b \leq 10.0\ \text{mm} \quad \text{[Mathematical Formula 3]}$$

In this way, by positioning front end 7E of shaping air ring 7 behind discharge edge 6D of rotary atomizing head 6 within the range of 0.1~10.0 mm, it will be possible to create airflow that is less turbulent near the end of rotary atomizing head 6. As a result, it will be possible to stabilize the flow of the coating material particles discharged from rotary atomizing head 6 and to improve the coating efficiency. Also, it will be possible to prevent the coating material that is discharged from discharge edge 6D of rotary atomizing head 6 from adhering to front end 7E.

Further, the radial width dimension of front end 7E of shaping air ring 7 is the radial dimension c between points P2 and P3 when the corner (boundary portion) between front outer cylinder surface 7B and front end 7E is point P3. This width dimension c may be set as shown in the following Mathematical Formula 4.

$$c \leq 2\ \text{mm} \quad \text{[Mathematical Formula 4]}$$

Figure 4:
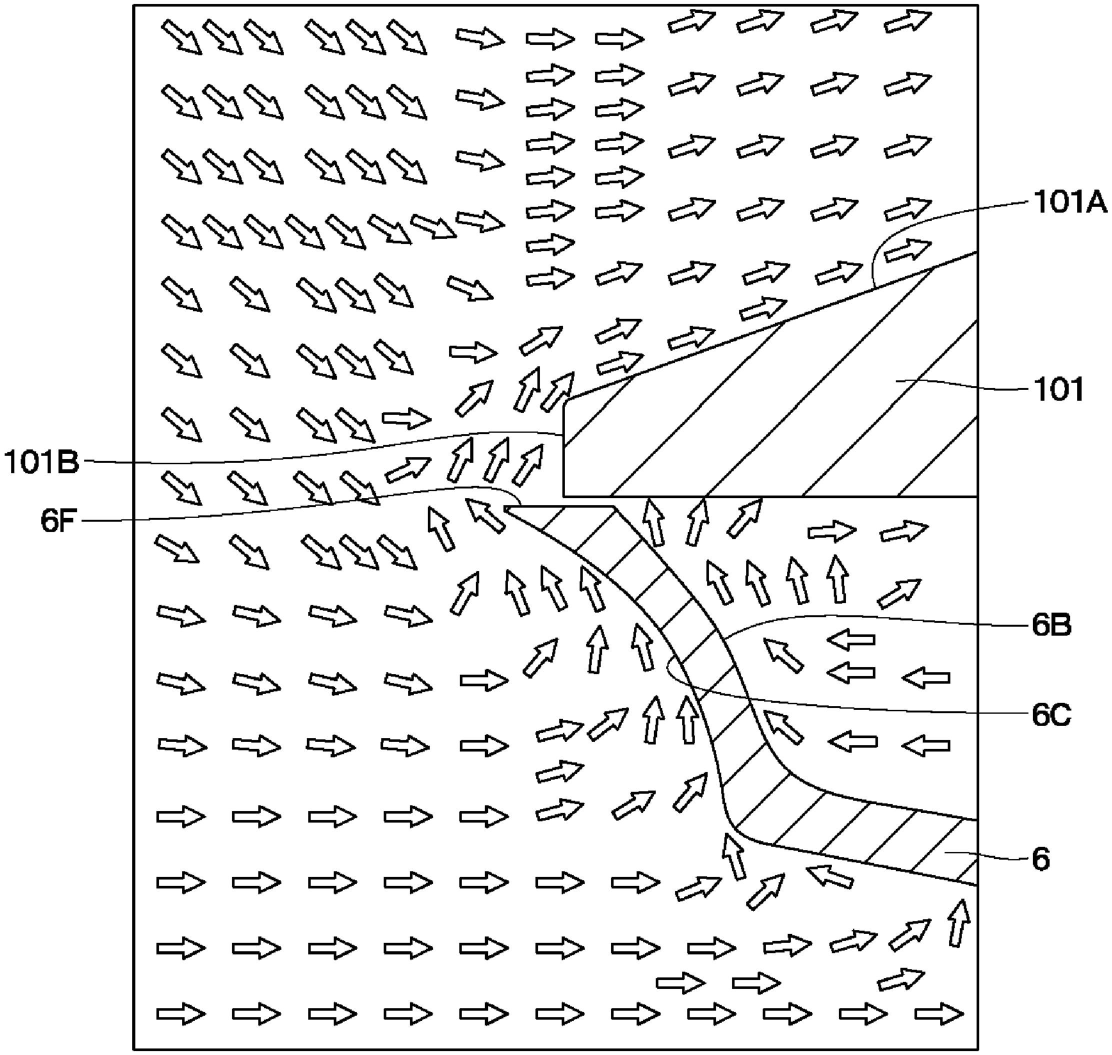
FIG. 4 This is an explanatory diagram that shows a comparative example of the flow of air when the width dimension of the front end of the shaping air ring is set to be greater than 2 mm.

Here, when rotary atomizing head 6 rotates, air flow (rotational flow) is generated in the tangential direction of the outer circumferential surface of rotary atomizing head 6. As a result of diligent research by the inventors of the present invention, it was determined that, when there is a wide end surface as a result of front end 7E near rotary atomizing head 6, part of the rotational flow will flow backward along outer cylinder surface 101A of shaping air ring 101, as shown in FIG. 4. More specifically, if the width dimension of front end 101B of shaping air ring 101 is set to be larger than 2 mm, the air near front end 101B will be carried away by the rotational flow. As a result, the pressure near the front side of front end 101B decreases, and part of the rotational flow will flow along outer cylinder surface 101A side of shaping air ring 101 to the rear side due to the Coanda effect, as shown by the arrow in FIG. 4. In the illustration in this FIG. 4, the shaping air is not being jetted out.

The air flow in FIG. 4 is opposite to the flow during coating, which conveys the coating material particles forward. Therefore, it is necessary to increase the flow rate of the shaping air so that the coating material particles can be fed forward against the air flow in the opposite direction. However, if the shaping air flow rate is increased, the velocity of the air flow near the object to be coated is affected, resulting in a decrease in the coating efficiency.

In contrast, when width dimension c of front end 7E is set to 2 mm or less, as in the present example of embodiment, no large air pocket will be formed near the front side of front end 7E, making it possible to inhibit the pressure drop in front of front end 7E. As a result, it will be possible suppresses the air flow to the rear side along the side of front outer cylinder surface 7B of shaping air ring 7, allowing air to flow in the radial direction (radiation direction), as shown by the arrow in FIG. 3. In other words, because the reverse flow of the coating material particles can be suppressed, the shaping air flow can be reduced and the air flow near the object to be coated can be suppressed, thereby improving the coating efficiency of the coating material particles.

Front outer cylinder surface 7B, which is the outer cylinder surface of shaping air ring 7, is formed as a result of expansion from front end 7E to the rear side (so that the diameter dimension increases). More specifically, front outer cylinder surface 7B is formed as a tapered surface with a taper angle β in relation to a straight line C that extends in the front-back direction parallel to axis line O-O through point P3. The taper angle β of front outer cylinder surface 7B may be set as shown in the following Mathematical Formula 5.

$$\beta \leq 25° \quad \text{[Mathematical Formula 5]}$$

When the taper angle β of front outer cylinder surface 7B is set to 25° or less in relation to straight line C (axis line O-O), or in other words, in the configuration in which the taper angle β of front outer cylinder surface 7B is smaller and closer to axis line O-O, the air that is entrained by the rotational flow generated by the rotation of rotary atomizing head 6 can be reduced, making it possible to suppress the reverse flow of coating material particles to the rear side.

First shaping air jetting unit 8 is mounted on the outer circumferential surface of rotary atomizing head 6. First shaping air jetting unit 8 jets the first shaping air toward the coating material that is discharged from discharge edge 6D. First shaping air jetting unit 8 is formed as a circular ring gap between outer circumferential surface 6B of rotary atomizing head 6 and inner cylinder surface 7A of shaping air ring 7. As a result, this allows first shaping air jetting unit 8 to jet the first shaping air stably due to the lack of any obstacles in front of it. Second shaping air jetting unit 8 is connected to an air supply source (not shown in the figure) via second shaping air supply path 8A or the like.

First shaping air jetting unit 8 is formed with a uniform gap in the front-back direction as a result of the formation of inner cylinder surface 7A of shaping air ring 7 with uniform inner diameter dimensions and with angle α of front side portion 6F of outer circumferential surface 6B of rotary atomizing head 6 set to be within the range of 0 to 10°. Also, first shaping air vent 8 is narrowed to a gap dimension A of 0.1~1.0 mm at its outlet. As a result, this allows first shaping air jetting unit 8 to jet the first shaping air onto the coating material particles in a laminar flow state with good jetting direction and convergence, etc.

Second shaping air jetting unit 9 is positioned radially outward from first shaping air jetting unit 8 and surrounds rotary atomizing head 6. Second shaping air jetting unit 9 jets the second shaping air toward the coating material discharged from discharge edge 6D of rotary atomizing head 6. Second shaping air jetting unit 9 is formed by a number of circumferentially aligned holes in step 7D of shaping air ring 7. Second shaping air jetting unit 9 may be connected to an air supply source (not shown in the figure) via a second shaping air supply path 9A or the like. Second shaping air jetting unit 9 may be eliminated and the shaping air may be jetted only from first shaping air jetting unit 8.

Here, virtual taper surface D is provided that expands toward the rear side relative to straight line C that extends in the front-back direction parallel to axis line O-O through point P3. Also, virtual taper surface D has a taper angle γ of 25° in relation to straight line C. Further, second shaping air jetting unit 9 may be positioned inside virtual taper surface D (at a position close to axis line O-O). As a result, this allows the air around rotary atomizing head 6 to flow in the radial direction (radiation direction) against the Coanda effect that attempts to flow along front outer cylinder surface 7B to the rear side, making it possible to reduce the shaping air flow rate, reduce the air flow near the object to be coated and improve the coating efficiency of the coating material particles.

Rotary atomizing head-type sprayer 1 according to the present example of embodiment has the configuration described above, and the following is a description of the operations of rotary atomizing head-type sprayer 1 when performing coating operations.

First, turbine air is supplied to the turbine of air motor 3 in order to rotate rotary axis 4 and rotary atomizing head 6 at high speed. In this state, the coating material from the coating material supply source may be supplied to rotary atomizing head 6 through coating material flow path 5A of feed tube 5. As a result, rotary atomizing head 6 will spray the coating material that has been supplied as the coating material particles.

In this case, a high voltage may be applied to rotary atomizing head 6 via air motor 3 or rotary axis 4, etc. The coating material particles sprayed from rotary atomizing head 6, or in other words, the charged coating material particles, will fly toward the object to be coated, such as an automobile body connected that has been grounded, and can be applied as a coating on the surface to be coated.

On the other hand, the coating material particles discharged from discharge edge 6D of rotary atomizing head 6 will be jetted from the rear side by the first shaping air jetted from first shaping air jetting unit 8 and the second shaping air jetted from second shaping air jetting unit 9, making it possible to shape the jetting pattern into a good shape.

Here, the coating efficiency, which is the ratio of the coating material that adheres to the surface to be coated in relation to the sprayed coating material, can be increased to some extent (about 90%). However, some of the coating material particles sprayed from rotary atomizing head 6 will fail to reach the surface to be coated of the object to be coated, and will be scattered around the object to be coated. Therefore, this makes it difficult to achieve a coating efficiency as close to 100% as possible.

Therefore, in this example of embodiment, the change in coating efficiency was measured from the perspectives of structure and control. From the structural perspective, the width dimension c of front end 7E of shaping air ring (SA ring) 7, the external taper angle β of shaping air ring 7, and the gap dimension a of first shaping air jetting unit (first SA jetting unit) 8 may be adjusted. From the control perspective, the rotational speed of rotary atomizing head 6, the flow rate of the shaping air (SA), the coating distance from rotary atomizing head 6 to the surface to be coated of the object to be coated, and the applied voltage may be adjusted. The measurement results are shown in Tables 1 and 2 below.

TABLE 1

| | | SA ring front end width dimension (c) [mm] | SA ring external taper angle (β) [°] | First SA discharge area gap dimension (a) [mm] | Rotary atomizing head outer peripheral surface angle (α) [°] | SA ring retraction dimensions (b) [mm] | Rotary atomizing head rotational speed [krpm] | SA flow rate [Nl/min] | Coating distance [mm] | Applied voltage [kV] | Amount of paint particles that are not directed towards the object to be coated | Amount of paint particles that flow along the painted surface of the object to be coated and fail to adhere to the surface | Coating efficiency % |
|---|---|---|---|---|---|---|---|---|---|---|---|---|---|
| Example of embodiment | | 2 (2 or less) | 22 (25 or less) | 0.1~1.0 | 0 | 4 | 20 | 100~300 | 100 (90~110) | −60 (−50 or more) | None | None | 98 or more |
| Comparative example | 1 | 4 | 22 | 0.1~1.0 | 0 | 4 | 20 | 100~300 | 100 | −60 | A little | None | 95 |
| | 2 | 6 | 22 | 0.1~1.0 | 0 | 4 | 20 | 100~300 | 100 | −60 | A lot | None | 90 |
| | 3 | 2 | 35 | 0.1~1.0 | 0 | 4 | 20 | 100~300 | 100 | −60 | A little | None | 95 |
| | 4 | 2 | 45 | 0.1~1.0 | 0 | 4 | 20 | 100~300 | 100 | −60 | A little | None | 93 |
| | 5 | 2 | 55 | 0.1~1.0 | 0 | 4 | 20 | 100~300 | 100 | −60 | A lot | None | 90 |
| | 6 | 2 | 22 | 1.1 | 0 | 4 | 20 | 100~300 | 100 | −60 | A little | None | 95 |
| | 7 | 2 | 22 | 1.2 | 0 | 4 | 20 | 100~300 | 100 | −60 | A lot | None | 92 |
| | 8 | 2 | 22 | 1.5 | 0 | 4 | 20 | 100~300 | 100 | −60 | A very large amount | None | 88 |

TABLE 2

| | | SA ring front end width dimension (c) [mm] | SA ring external taper angle (β) [°] | First SA discharge area gap dimension (a) [mm] | Rotary atomizing head outer peripheral surface angle (α) [°] | SA ring retraction dimensions (b) [mm] | Rotary atomizing head rotational speed [krpm] | SA flow rate [Nl/min] | Coating distance [mm] | Applied voltage [kV] | Amount of paint particles that are not directed towards the object to be coated | Amount of paint particles that flow along the painted surface of the object to be coated and fail to adhere to the surface | Coating efficiency % |
|---|---|---|---|---|---|---|---|---|---|---|---|---|---|
| Comparative example | 9 | 2 | 22 | 1.2 | 10 | 4 | 20 | 100~300 | 100 | −60 | A lot | None | 92 |
| | 10 | 2 | 22 | 1.6 | 15 | 4 | 20 | 100~300 | 100 | −60 | A very large amount | None | 88 |
| | 11 | 2 | 22 | 0.1~1.0 | 0 | 15 | 20 | 100~300 | 100 | −60 | A little | None | 96 |
| | 12 | 2 | 22 | 0.1~1.0 | 0 | 20 | 20 | 100~300 | 100 | −60 | A lot | None | 93 |
| Conventional example | | 6~8 | 30~60 | None | 45 | 11 | 20~40 | 300~400 | 200 | −80 | A very large amount | A very large amount | 70~80 |

TABLE 3

| | | SA ring front end width dimension (c) [mm] | SA ring external taper angle (β) [°] | First SA discharge area gap dimension (a) [mm] | Rotary atomizing head outer peripheral surface angle (α) [°] | SA ring retraction dimensions (b) [mm] | Rotary atomizing head rotational speed [krpm] | SA flow rate [Nl/min] | Coating distance [mm] | Applied voltage [kV] | Amount of paint particles that are not directed towards the object to be coated | Amount of paint particles that flow along the painted surface of the object to be coated and fail to adhere to the surface | Coating efficiency % |
|---|---|---|---|---|---|---|---|---|---|---|---|---|---|
| Comparative example | 13 | 2 | 22 | 0.1~1.0 | 0 | 4 | 25 | 100~300 | 100 | −60 | A little | None | 96 |
| | 14 | 2 | 22 | 0.1~1.0 | 0 | 4 | 35 | 100~300 | 100 | −60 | A lot | None | 95 |
| | 15 | 2 | 22 | 0.1~1.0 | 0 | 4 | 45 | 100~300 | 100 | −60 | A lot | None | 93 |
| | 16 | 2 | 22 | 0.1~1.0 | 0 | 4 | 20 | 400 | 100 | −60 | None | A little | 96 |
| | 17 | 2 | 22 | 0.1~1.0 | 0 | 4 | 20 | 500 | 100 | −60 | None | A lot | 95 |
| | 18 | 2 | 22 | 0.1~1.0 | 0 | 4 | 20 | 600 | 100 | −60 | None | A lot | 92 |
| | 19 | 2 | 22 | 0.1~1.0 | 0 | 4 | 20 | 100~300 | 130 | −60 | None | A little | 96 |
| | 20 | 2 | 22 | 0.1~1.0 | 0 | 4 | 20 | 100~300 | 150 | −60 | None | A little | 94 |
| | 21 | 2 | 22 | 0.1~1.0 | 0 | 4 | 20 | 100~300 | 200 | −60 | None | A lot | 90 |
| | 22 | 2 | 22 | 0.1~1.0 | 0 | 4 | 20 | 100~300 | 100 | −40 | None | None | 97 |
| | 23 | 2 | 22 | 0.1~1.0 | 0 | 4 | 20 | 100~300 | 100 | −30 | None | None | 92 |
| | 24 | 2 | 22 | 0.1~1.0 | 0 | 4 | 20 | 100~300 | 100 | 0 | A little | A lot | 85 |

First, the adjustments made in order to obtain high coating efficiency (coating efficiency of 98% or higher), which is the subject of this example of embodiment, will be described.

In the area surrounding the tip of rotary atomizing head 6, there are coating material particles that do not move toward the object to be coated due to the turbulence of the coating material particles. Also, on the surface to be coated of the object to be coated, there are coating material particles that flow along this surface to be coated and do not adhere to the surface. By minimizing these coating material particles that do not contribute to coating, high coating efficiency (coating efficiency of 98% or higher) can be achieved.

The coating conditions of the current rotary atomizing head-type sprayer shown as a conventional example and the results obtained by these coating conditions will be described. In the conventional example shown in Table 2, the width dimension C of the front end of shaping air ring (SA ring) is 6 to 8 mm, the external taper angle β of shaping air ring is set at 30 to 60°, and there is no first shaping air jetting unit (the first SA jetting unit). Also, the angle α of the outer circumferential surface in the direction of diameter reduction from the discharge edge to the rear side of the rotary atomizing head is set to 45°, the rotational speed of the rotary atomizing head is set to 20-40 krpm, the shaping air (SA) flow rate is set to 300-400 Nl/min, the coating distance is set to 200 mm, and the applied voltage is set to −80 kV. As a result, the amount of coating material particles that are not directed toward the object to be coated will be "A very large amount," and the amount of coating material particles that flow along the surface of the object to be coated and fail to adhere to the object to be coated will be "A very large amount." As a result, the coating efficiency is only 70-80%.

The amount of coating material particles that are not directed toward the object to be coated and the amount of coating material particles that flow along the surface to be coated, but that fail to adhere to the object to be coated may be assessed on a 4-stage scale of "None" (an amount that is too small to be measured), "A little," "A lot," and "A very large amount."

In contrast, in rotary atomizing head sprayer 1 of the present example embodiment, as shown in Table 1, the painting conditions are set to include a width dimension C of front end 7E of shaping air ring (SA ring) 7 of 2 mm, an outer taper angle β of shaping air ring 7 of 22°, a gap dimension A of first shaping air discharge portion (first SA discharge portion) 8 of 0.1~1.0 mm, an angle α of 0° for front side portion 6F (peripheral surface) in the direction that retracts from discharge end edge 6D of rotary atomizing head 6 to the back side, and a dimension B of 4 mm following retraction of front end 7E of shaping air ring (SA ring) 7 from discharge end 6D of rotary atomizing head 6. Also, the speed of rotary atomizing head 6 is set to 20 krpm, the flow rate of shaping air (SA) is set to 100 to 300 NL/min, the coating distance is set to 100 mm, and the applied voltage is set to −60 kV. As a result, the amount of coating material particles that are not directed toward the object to be coated becomes "None" and the amount of coating material particles that flow along the surface of the object to be coated and do not adhere to the object to be coated becomes "None." As a result, the coating efficiency can be 98% or higher.

Also, under the painting conditions of rotary atomizing head sprayer 1 of the example of embodiment, the coating efficiency can be 98% or more when the width dimension C of front end 7E of shaping air ring 7 is set to 2 mm or less, the angle α of front portion 6F of rotary atomizing head 6 (peripheral surface) is set to 0~10°, the retraction dimension B of shaping air ring 7 is set to 0.1~10.0 mm, the outer taper angle β of shaping air ring 7 is set to 25° or less, the coating distance is set to 90~110 mm, and the applied voltage is set to −50 kV or more.

This is because the first shaping air is jetted from first shaping air jetting unit 8 in the gap between rotary atomizing head 6 and inner cylinder surface 7A of shaping air ring 7, thereby creating a structure with no obstacles in front of first shaping air jetting unit 8 and making front side portion 6F of rotary atomizing head 6 parallel (uniform gap) to inner cylinder surface 7A of shaping air ring 7. This reduces turbulence in the air flow around rotary atomizing head 6 and stabilizes the shaping air flow without increasing the flow rate of the first shaping air. In other words, it will be possible to inhibit the bouncing of coating material particles on the surface of the object to be coated, which occurs when the shaping air flow rate is increased.

Further, by setting the width dimension C of front end portion 7E of shaping air ring 7 to 2 mm and setting the external taper angle β of shaping air ring 7 to 22°, it will be possible to inhibit the phenomenon of backward flow of coating material particles as a result of the Coanda effect.

Also, by setting the gap dimension A of first shaping air jetting unit 8 to 0.1~1.0 mm, setting the angle α of front side portion 6F of rotary atomizing head 6 to 0°, and setting the retraction dimension b of shaping air ring 7 to 4 mm, the first shaping air can be stabilized while the flow velocity is increased in order to direct the coating material particles to the object to be coated.

Next, Tables 1 and 2 show Comparative Examples 1~12 in order to describe the results of changing the coating conditions from the structural perspective. First, in Comparative Examples 1 and 2, the width dimension C of front end portion 7E of shaping air ring (SA ring) 7 is changed under each coating condition of the example of embodiment. In Comparative Example 1, in which the width dimension C is changed to 4 mm, the amount of coating material particles that are not directed toward the object to be coated becomes "A little," and the amount of particles that flow along the surface of the object to be coated and that fail to adhere to the surface of the object to be coated becomes "None." As a result, the coating efficiency will be 95%. Also, in Comparative Example 2, in which the width dimension C is changed to 6 mm, the amount of coating material particles that are not directed toward the object to be coated becomes "A lot," and the amount of coating material particles that flow along the surface to be coated, but that fail to adhere to the object to be coated becomes "None." As a result, the application efficiency remains at 90%.

In Comparative Examples 3 through 5, the external taper angle β of shaping air ring 7 is changed for each coating condition. In the case of Comparative Example 3, in which the external taper angle β is changed to 35°, the amount of coating material particles that are not directed toward the object to be coated becomes "A little" and the amount of coating material particles that flow along the surface of the object to be coated, but that fail to adhere to the object to be coated becomes "None." As a result, the coating efficiency will be 95%. Also, in Comparative Example 4, in which the external taper angle β is changed to 45°, the amount of coating material particles that are not directed toward the object to be coated becomes "A little" and the amount of coating material particles that flow along the surface of the object to be coated, but that fail to adhere to the object to be coated becomes "None." As a result, the coating efficiency will be 93%. Further, in Comparative Example 5, in which the external taper angle β is changed to 55°, the amount of coating material particles that are not directed toward the object to be coated becomes "A lot," and the amount of coating material particles that flow along the surface to be coated, but that fail to adhere to the object to be coated becomes "None." As a result, the application efficiency remains at 90%.

In Comparative Examples 6 to 8, the gap dimension A of first shaping air jetting unit (first SA jetting unit) 8 is changed for each coating condition of the example of embodiment. In Comparative Example 6, in which the gap dimension A is changed to 1.1 mm, the amount of coating material particles that are not directed toward the object to be coated becomes "A little," and the amount of particles that flow along the surface of the object to be coated and that fail to adhere to the surface of the object to be coated becomes "None." As a result, the coating efficiency will be 95%. Also, in Comparative Example 7, in which the gap dimension A is changed to 1.2 mm, the amount of coating material particles that are not directed toward the object to be coated becomes "A lot," and the amount of coating material particles that flow along the surface to be coated, but that fail to adhere to the object to be coated becomes "None." As a result, the coating efficiency will be 92%. Also, in Comparative Example 8, in which the gap dimension A is changed to 1.5 mm, the amount of coating material particles that are not directed toward the object to be coated becomes "A very large amount," and the amount of coating material particles that flow along the surface to be coated, but that fail to adhere to the object to be coated becomes "None." As a result, the application efficiency remains at 88%.

In Comparative Examples 9 and 10, the angle α of front side portion 6F (outer circumferential surface) of rotary atomizing head 6 is changed. In the case of Comparative Example 9, in which the angle α is changed to 10°, the angle α of 10° is within the range in which high coating efficiency can be obtained, but the gap dimension A is 1.2 mm due to the change of angle α to 10°. For this reason, in Comparative Example 9, the amount of coating material particles that are not directed toward the object to be coated becomes "A lot," and the amount of coating material particles that flow along the surface to be coated, but that fail to adhere to the object to be coated becomes "None." As a result, the coating efficiency will be 92%. In addition, in Comparative Example 10, in which the angle α is changed to 15°, the amount of coating material particles that are not directed toward the object to be coated becomes "A very large amount," and the amount of coating material particles that flow along the surface to be coated, but that fail to adhere to the object to be coated becomes "None." As a result, the application efficiency remains at 88%.

In Comparative Examples 11 and 12, the retraction dimension B of shaping air ring (SA ring) 7 is changed under each coating condition. In Comparative Example 11, in which the retraction dimension B is changed to 15 mm, the amount of coating material particles that are not directed toward the object to be coated becomes "A little," and the amount of particles that flow along the surface of the object to be coated and that fail to adhere to the surface of the object to be coated becomes "None." As a result, the coating efficiency will be 96%. In addition, in Comparative Example 12, in which the retraction dimension B is changed to 20 mm, the amount of coating material particles that are not directed toward the object to be coated becomes "A lot," and the amount of coating material particles that flow along the surface to be coated, but that fail to adhere to the object to be coated becomes "None." As a result, the coating efficiency will be 93%.

The results of Comparative Examples 1 to 12, in which the coating conditions from the structural perspective are changed, demonstrate that the coating efficiency can be increased up to about 95%. However, in order to increase the coating efficiency to 98% or higher, which is a high coating efficiency, it is clear that many coating conditions must be satisfied simultaneously.

Next, Table 3 describes the results that were obtained when the coating conditions from the control aspect are changed. First, in Comparative Examples 13-15, the rotational speed of rotary atomizing head 6 was changed amongst the various coating conditions of the example of embodiment. In Comparative Example 13, in which the rotational speed was changed to 25 krpm, the amount of coating material particles that are not directed toward the object to be coated becomes "A little," and the amount of coating material particles that flow along the surface of the object to be coated, but that fail to adhere to the object to be coated becomes "None." As a result, the coating efficiency will be 96%. Also, in Comparative Example 14, in which the rotational speed was changed to 35 krpm, the amount of coating material particles that are not directed toward the object to be coated becomes "A lot," and the amount of coating material particles that flow along the surface to be coated, but that fail to adhere to the object to be coated becomes "None." As a result, the coating efficiency will be 95%. Further, in Comparative Example 15, in which the rotational speed was changed to 45 krpm, the amount of coating material particles that are not directed toward the object to be coated becomes "A lot," and the amount of coating material particles that flow along the surface to be coated, but that fail to adhere to the object to be coated becomes "None." As a result, the coating efficiency will be 93%.

In Comparative Examples 16 to 18, the flow rate of the shaping air (SA) was changed for each of the coating conditions in the example of embodiment. In Comparative Example 16, in which the flow rate of the first shaping air was changed to 400 Nl/min, the amount of coating material particles that are not directed toward the object to be coated becomes "None," and the amount of coating material particles that flow along the surface to be coated, but that fail to adhere to the object to be coated becomes "A little." As a result, the coating efficiency will be 96%. In addition, in Comparative Example 17, in which the flow rate of the first shaping air was changed to 500 Nl/min, the amount of coating material particles that are not directed toward the object to be coated becomes "None," and the amount of coating material particles that flow along the surface to be coated, but that fail to adhere to the object to be coated becomes "A lot." As a result, the coating efficiency will be 95%. Further, in Comparative Example 18, in which the flow rate of the first shaping air was changed to 600 Nl/min, the amount of coating material particles that are not directed toward the object to be coated becomes "None," and the amount of coating material particles that flow along the surface to be coated, but that fail to adhere to the object to be coated becomes "A lot." As a result, the coating efficiency will be 92%.

In Comparative Examples 19 to 21, the coating distance was changed for each of the coating conditions of the example of embodiment. In Comparative Example 19, in which the coating distance was changed to 130 mm, the amount of coating material particles that are not directed toward the object to be coated becomes "None," and the amount of coating material particles that flow along the surface to be coated, but that fail to adhere to the object to be coated becomes "A little." As a result, the coating efficiency will be 96%. In addition, in Comparative Example 20, in which the coating distance was changed to 150 mm, the amount of coating material particles that are not directed toward the object to be coated becomes "None," and the amount of coating material particles that flow along the surface to be coated, but that fail to adhere to the object to be coated becomes "A little." As a result, the coating efficiency will be 94%. Further, in Comparative Example 21, in which the coating distance was changed to 200 mm, the amount of coating material particles that are not directed toward the object to be coated becomes "None," and the amount of coating material particles that flow along the surface to be coated, but that fail to adhere to the object to be coated becomes "A lot." As a result, the application efficiency remains at 90%.

In Comparative Examples 22 to 24, the applied voltage was changed for each of the coating conditions of the example of embodiment. In Comparative Example 22, in which the applied voltage was changed to −40 kV, the amount of coating material particles that are not directed toward the object to be coated becomes "None," and the amount of coating material particles that flow along the surface to be coated, but that fail to adhere to the object to be coated becomes "None." As a result, the coating efficiency will be 97%. Also, in Comparative Example 23, in which the applied voltage was changed to −30 kV, the amount of coating material particles that are not directed toward the object to be coated becomes "None," and the amount of coating material particles that flow along the surface to be coated, but that fail to adhere to the object to be coated becomes "None." As a result, the coating efficiency will be 92%. Further, in Comparative Example 24, in which the applied voltage was changed to 0 kV (non-static), the amount of coating material particles that are not directed toward the object to be coated becomes "A little," and the amount of coating material particles that flow along the surface to be coated, but that fail to adhere to the object to be coated becomes "A lot." As a result, the application efficiency remains at 85%.

The results of Comparative Examples 13 to 24, in which the coating conditions were changed from the control perspective, demonstrate that the coating efficiency can be increased up to about 95%, as was the case when changing the coating conditions from the structural perspective, but many coating conditions must be satisfied simultaneously in order to increase the efficiency to 98% or higher, which is a high coating efficiency.

In this way, according to this example of embodiment, inner cylinder surface 7A of shaping air ring 7 is formed with a front side portion facing outer circumferential surface 6B of rotary atomizing head 6 with uniform inner diameter dimensions. Also, first shaping air jetting unit 8 is formed as a ring gap between outer circumferential surface 6B (front side portion 6F) of rotary atomizing head 6 and inner cylinder surface 7A of shaping air ring 7. Further, the radial clearance dimension A between front portion 6F of rotary atomizing head 6 and inner cylinder surface 7A of shaping air ring 7 is set to 0.1 to 1.0 mm. Front end 7E of shaping air ring 7 is positioned 0.1 to 10.0 mm from release edge 6D to the rear of rotary atomizing head 6. The radial width dimension c of front end 7E of shaping air ring 7 is set to 2 mm or less. For front outer cylinder surface 7B of shaping air ring 7, the taper angle β which expands from front end 7E of shaping air ring 7 toward the rear side, may be set to 25° or less relative to axis line O-O. Second shaping air jetting unit 9 is located inside virtual taper surface D with a taper angle of 25° that expands from front end 7E of shaping air ring 7 to the rear side.

Therefore, inner cylinder surface 7A of shaping air ring 7 is formed with uniform inner diameter dimensions, and the angle α of front side portion 6F of outer circumferential surface 6B of rotary atomizing head 6 is formed within the range of 0 to 10°, so first shaping air jetting unit 8 is formed with a uniform gap in the front-back direction. Also, because the gap dimension A of first shaping air outlet 8 is narrowed to 0.1 to 1.0 mm, the first shaping air can be sprayed into the paint particles in a state in which the direction of discharge, convergence, etc. is well-established.

Also, because front end 7E of shaping air ring 7 is positioned on the rear side in a range of 0.1 to 10.0 mm from release edge 6D of rotary atomizing head 6, the flow of paint particles released from rotary atomizing head 6 can be stabilized, making it possible to improve the application efficiency. Further, it will be possible to prevent the coating material discharged from discharge edge 6D of rotary atomizing head 6 from adhering to front end 7E.

Also, because the width dimension c of front end 7E of shaping air ring 7 is set to 2 mm or less, it will be possible to prevent the formation of a large air pocket near the front side of front end 7E. In other words, by suppressing the pressure drop on front side of front end 7E, it will be possible to prevent coating material particles from flowing in the opposite direction toward the low-pressure area. As a result, this makes it possible to stabilize the air flow near the object to be coated by reducing the flow rate of the first shaping air and the second shaping air, thereby improving the coating efficiency of the coating material particles.

Also, the taper angle β of front outer cylinder surface 7B of shaping air ring 7 is set to be 25° or less in relation to the straight line C parallel to axis line O-O, and is configured to be close to axis line O-O. As a result, this makes it possible to reduce the air entrained by the rotational flow generated by the rotation of rotary atomizing head 6, thereby suppressing the reverse flow of coating material particles to the rear side. Also, because the coating material particles flying in the air are not caught in this reverse flow (turbulent flow), it will be possible to prevent the coating material from adhering to rotary atomizing head 6 and shaping air ring 7.

Further, second shaping air jetting unit 9 is positioned inside virtual taper surface D (close to axis line O-O), where the taper angle γ is set to 25° in relation to the straight line C. As a result, this allows the air around rotary atomizing head 6 to flow in the radial direction (radiation direction) against the Coanda effect that attempts to flow along front outer cylinder surface 7B to the rear side, making it possible to reduce the shaping air flow rate, reduce the air flow near the object to be coated and improve the coating efficiency of the coating material particles.

As a result, the coating efficiency of rotary atomizing head-type sprayer 1 can be improved. Also, because there is no need to change the painting conditions such as the rotational speed of rotary atomizing head 6, the shaping air, or the paint flow rate, etc., by maintaining the range of painting by one rotary atomizing head sprayer 1, it will be possible to improve the coating efficiency while maintaining productivity.

Figure 5:
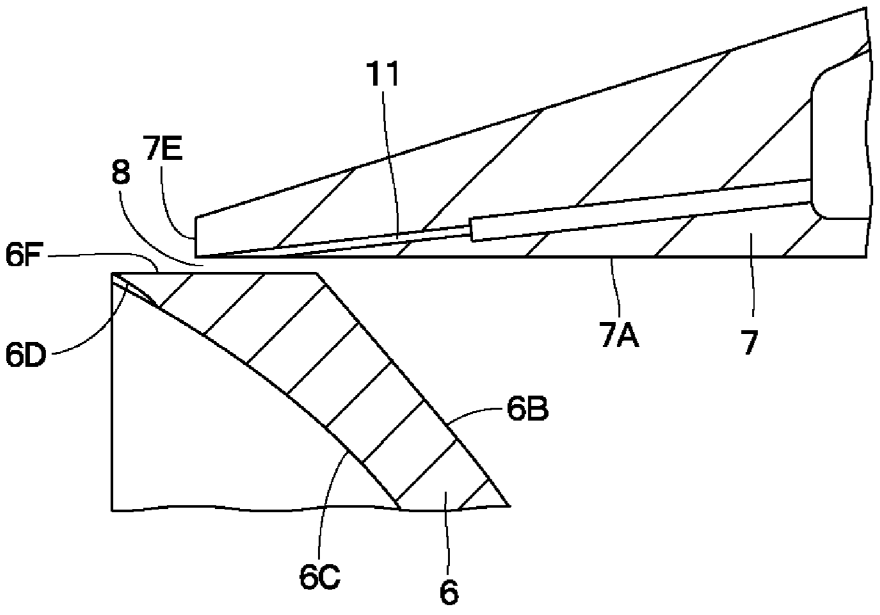
FIG. 5 This is a cross-sectional view showing the second shaping air jetting unit according to the first variation.

Moreover, in the example of embodiment, as an example, shaping air ring 7 has step 7D between front outer cylinder surface 7B and rear outer cylinder surface 7C, while second shaping air jetting unit 9 is formed as a plurality of holes in the circumferential direction on step 7D. However, the present invention is not limited to this configuration, and may be configured as in the first variant shown in FIG. 5. In other words, second shaping air jetting unit 11 in the first variant is positioned in shaping air ring 7 in a circumferential direction, and the tip of shaping air jetting unit 11 opens to inner cylinder 7A around front side portion 6F of rotary atomizing head 6. This allows the second shaping air jetted from second shaping air jetting unit 11 to merge with the first shaping air jetted from first shaping air jetting unit 8, thereby increasing the velocity of the shaping air. As a result, the high-velocity shaping air can atomize even high-viscosity coating material, making it possible to improve the quality of the coating finish. This first variant can be applied in the same way to the second and third examples of embodiments described below.

Figure 6:
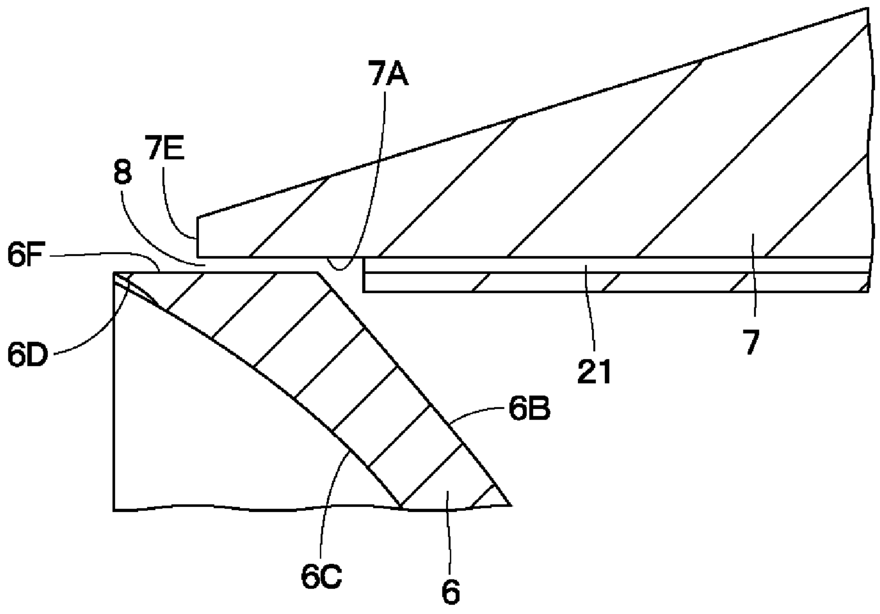
FIG. 6 This is a cross-sectional view showing the second shaping air jetting unit according to the second variation.

Also, it is acceptable to have a structure as shown in the second variant shown in FIG. 6. In other words, second shaping air jetting unit 21 according to the second variant may be formed as a slit on inner cylinder surface 7A of shaping air ring 7 that opens to the rear side of first shaping air jetting unit 8. As a result, this allows second shaping air jetting unit 21 to merge the second shaping air with the first shaping air jetted from first shaping air jetting unit 8, as was the case with second shaping air jetting unit 11 in the first variant, in order to increase the velocity of the shaping air. As a result, second shaping air jetting unit 21 can be mounted without thickening front end 7E of shaping air ring 7 in the radial direction, thereby improving both the coating efficiency and the quality of coating finish. This second variant can be similarly applied in the same way to the second and third examples of embodiments described below.

Further, the first example of embodiment describes the case in which rotary atomizing head-type sprayer 1 is a direct-charging type electrostatic coating machine that directly applies high voltage to the coating material supplied to rotary atomizing head 6. However, the present invention is not limited to this, and it is also acceptable to have a configuration that may be applied to an indirectly charged rotary atomizing head-type sprayer, which has an external electrode that discharges high voltage at the outer circumference of the housing and applies high voltage to the coating material particles sprayed from the rotary atomizing head by the discharge from this external electrode. Further, the present invention can be applied to non-electrostatic coating machines that perform coating without applying high voltage to the coating material.

Figure 7:
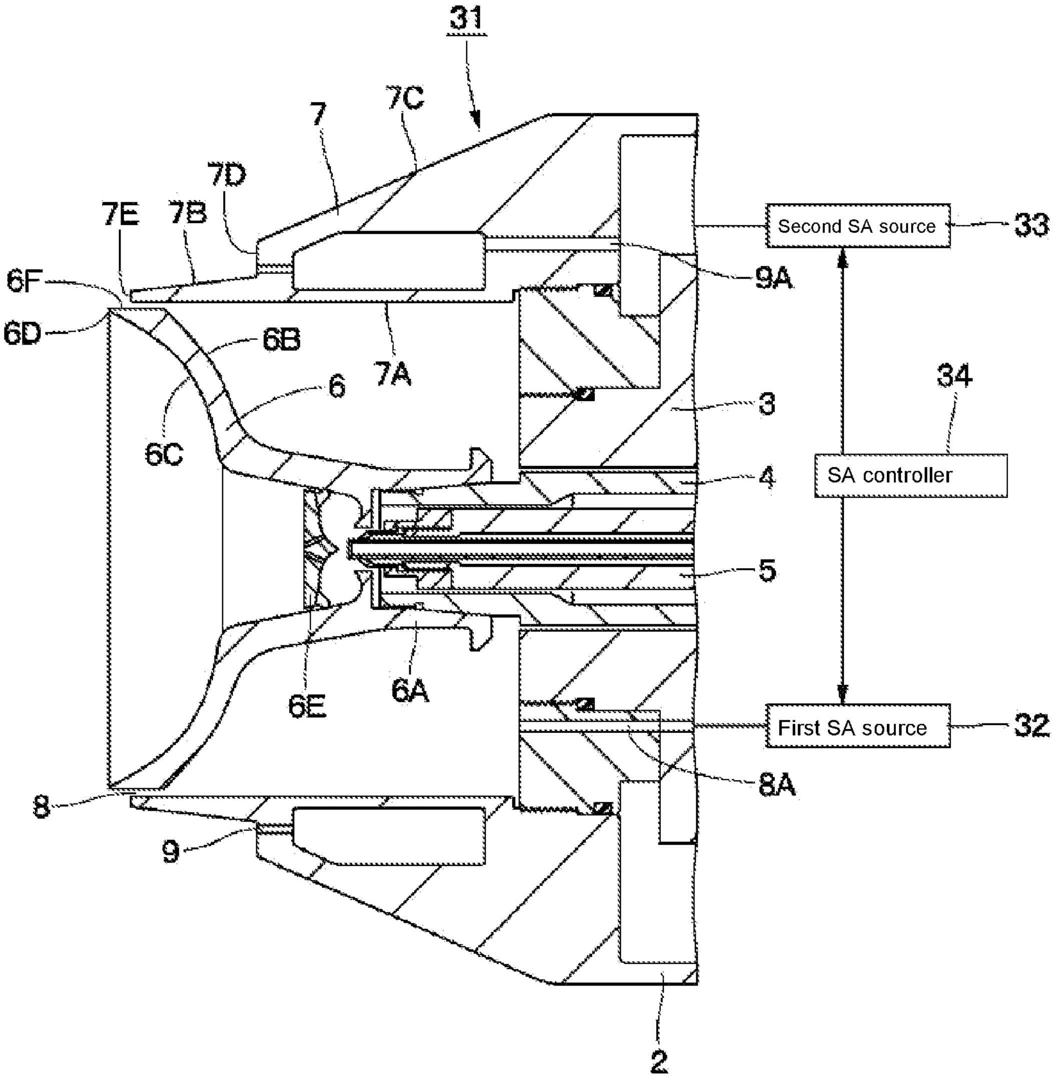
FIG. 7 This is a block diagram showing the rotary atomizing head-type sprayer according to the second example of embodiment of the present invention.

Next, FIG. 7 shows the second example of embodiment of the present invention. The second example of embodiment is characterized by the fact that it is provided with a shaping air control device that controls the discharge amount of the first shaping air and the discharge amount of the second shaping air, and the shaping air control device can control the ratio of the discharge amount of the first shaping air and the discharge amount of the second shaping air such that the spray pattern of the paint released from the rotary atomizing head will be smaller. In the second example of embodiment, the same reference symbols will be assigned to the same components as those described in the first example of embodiment above, and description thereof will be omitted.

In FIG. 7, rotary atomizing head sprayer 31 according to the second example of embodiment is constructed of housing 2, air motor 3, rotating axis 4, feed tube 5, rotary atomizing head 6, shaping air ring 7, first shaping air outlet 8, and second shaping air outlet 9, as was the case with rotary atomizing head sprayer 1 according to the first example of embodiment. Further, rotary atomizing head sprayer 31 according to the second example of embodiment has shaping air controller 34 as described below.

First shaping air jetting unit 8 may be connected to a first shaping air source (first SA source) via first shaping air supply path 8A or the like. Also, second shaping air jetting unit 9 may be connected to a second shaping air source (second SA source) via second shaping air supply path 9A or the like. Here, for first shaping air source 32 and second shaping air source 33, the amount of jetting of shaping air may then be controlled by shaping air control device 34.

Shaping air controller 34 controls the flow rate of the first shaping air that is ejected from first shaping air outlet 8 (the amount of ejection) and the flow rate of the second shaping air that is ejected from second shaping air outlet 9 (the amount of ejection). More specifically, shaping air controller 34 controls the ratio of the ejection of the first shaping air to the ejection of the second shaping air such that the spray pattern of paint that is discharged from rotary atomizing head 6 will be smaller.

An example of the ratio when shaping air controller 34 controls the discharge of the first shaping air and the discharge of the second shaping air will be described next. For example, when painting with a large spray pattern (large pattern), shaping air controller 34 may have conditions including diameter dimension of rotary atomizing head 6 of 70 mm, a rotation speed of 20 krpm, and a paint spray volume of 250 CC/min, and the discharge volume of the first shaping air may be set to 300 NL/min, and the discharge volume of the second shaping air to 50 NL/min. In other words, with a large pattern, the spray pattern of paint that is discharged from rotary atomizing head 6 may be reduced by setting the ratio of the ejection amount of the first shaping air to the ejection amount of the second shaping air to be 6:1.

Also, when painting with a spray pattern (small pattern) that is smaller than the large pattern, shaping air controller 34 may set the discharge volume of the first shaping air to 50 NL/min and the discharge volume of the second shaping air to 400 NL/min, under conditions in which the diameter dimension of rotary atomizing head 6 is 70 mm, the rotation speed is 20 krpm, and the paint spray volume is 150 CC/min. In other words, with a small pattern, the spray pattern of paint released from rotary atomizing head 6 may be reduced by setting the ratio of the ejection amount of the first shaping air to the ejection amount of the second shaping air to be 1:8.

In this way, with the second example of embodiment configured in this manner, the same effect and function can be obtained as described with the first example of embodiment above. In particular, rotary atomizing head sprayer 31 according to the second example of embodiment can control the ratio of the ejection of the first shaping air from first shaping air ejection 8 to the ejection of the second shaping air from second shaping air ejection 9 by means of shaping air controller 34. Therefore, the spray pattern of paint that is discharged from rotary atomizing head 6 can be reduced. As a result, it will be possible to prevent spray paint from scattering around the surrounding area and to improve coating efficiency.

Figure 8:
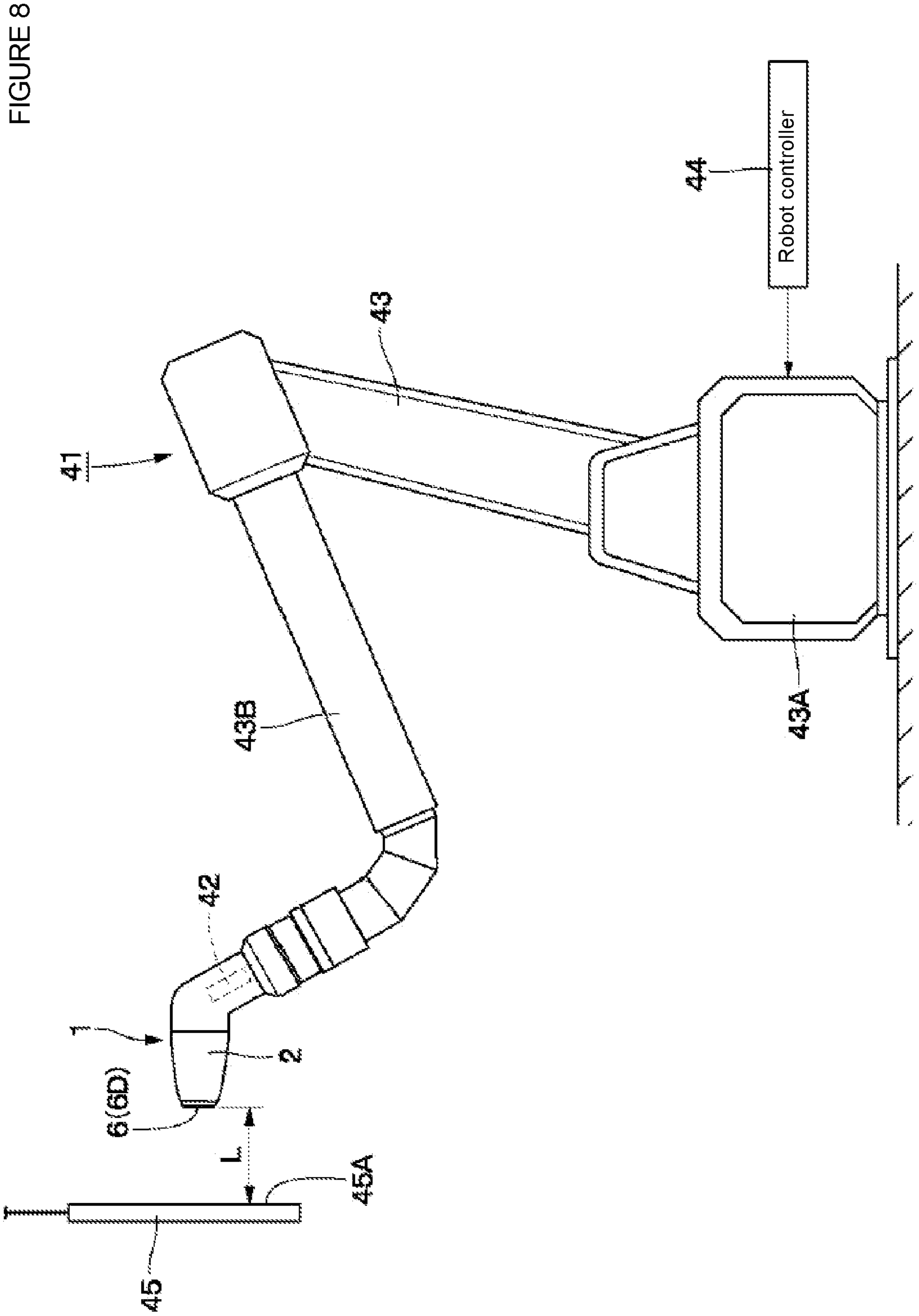
FIG. 8 This is a block diagram showing the electrostatic coating machine according to the third example of embodiment of the present invention.

Next, FIG. 8 shows the third example of embodiment of the present invention. The third example of embodiment is characterized by the fact that it is provided with a high voltage generator that applies high voltage to paint released from the rotary atomizing head, a sprayer transfer means with a rotary atomizing head sprayer attached, and a transfer control device that controls the sprayer transfer means, wherein the transfer control device will control the sprayer transfer means such that the painting distance from the release edge to the surface to be coated will be maintained at 90 to 150 mm. In the third example of embodiment, the same reference symbols will be assigned to the same components as those described in the first example of embodiment above, and description thereof will be omitted.

In FIG. 8, electrostatic painting apparatus 41 according to the third example of embodiment is constructed of rotary atomizing head sprayer 1 according to the first example of embodiment, along with painting robot 43 and robot controller 44 as described below. Rotary atomizing head-type sprayer 1 consists of housing 2, air motor 3, rotary axis 4, feed tube 5, rotary atomizing head 6, shaping air ring 7, first shaping air jetting unit 8, and second shaping air jetting unit 9, and high-voltage generator 42, to be described hereinafter.

High voltage generator 42 is provided in housing 2 Indicated by the dashed line in the figure). High voltage generator 42 may be constructed, for example, of a Cockcroft circuit, and it will increase the voltage supplied from a power supply (not shown in the figure) to −60 to −120 kV. The output side of high voltage generator 42 may then be electrically connected, for example, to air motor 3, and as a result, high voltage generator 42 will apply high voltage to rotary atomizing head 6 via rotary axis 4, directly charging the high voltage onto the paint that may be discharged from rotary atomizing head 6.

Painting robot 43 as a sprayer transport means may have, for example, arm 43B that operates freely on support 43A. Rotary atomizing head sprayer 1 may be attached to the tip of arm 43B. Painting robot 43 operates arm 43B, etc. in accordance with the control signals from robot controller 44 described below. As the sprayer transfer means, in addition to the articulating robot, for example, a transfer means that performs only reciprocal motion may be used.

Robot control device 44 controls the painting robot as the movement control device. Robot control device 44 controls the coating distance L, etc., from discharge edge 6D of rotary atomizing head 6, which constitutes rotary atomizing head sprayer 1, to coating surface 45A of object to be coated 45, making it possible to improve the coating efficiency. More specifically, robot controller 44 controls painting robot 43 such that the coating distance L is kept between 90 and 150 mm with high voltage applied to the paint that is discharged from rotary atomizing head 6 by high voltage generator 42. In this way, if painting is performed with the coating distance L maintained at 90 to 150 mm, the coating efficiency can be improved to approximately 95% (if the coating distance L is not kept at 90 to 150 mm, the coating efficiency will be about 80%).

Here, if the coating distance L is greater than the upper limit of 150 mm, the electrical force line formed in the space to object to be coated 45 will weaken and the coating efficiency will be reduced. On the other hand, if the coating distance L is less than the lower limit value of 90 mm, there will be no decrease in coating efficiency, but there is a possibility that there will be multiple high voltage abnormalities as a result of approaching object to be coated 45, and line stoppage may occur. For this reason, the lower limit of coating distance L is set to 90 mm.

In this way, electrostatic painting apparatus 41 according to the fourth example of embodiment that is constructed in this manner is comprised of high voltage generator 42 to apply high voltage to the paint that may be discharged from rotary atomizing head 6, painting robot 43 onto which the rotary atomizing head painter 1 may be mounted, and robot controller 44 that controls painting robot 43. Robot controller 44 is then configured to control painting robot 43 such that the coating distance L from discharge edge 6D of rotary atomizing head 6 to coating surface 45A of object to be coated 45 is kept at 90 to 150 mm. In this way, if robot control device 44 controls painting robot 43, it will be possible to improve the coating efficiency for coating surface 45A of object to be coated 45.

Further, the third example of embodiment describes the case in which rotary atomizing head-type sprayer 1 is a direct-charging type electrostatic coating machine that directly applies high voltage to the coating material supplied to rotary atomizing head 6. However, the present invention is not limited to this, and it is also acceptable to have a configuration that may be applied to an indirectly charged rotary atomizing head-type sprayer, which has an external electrode that discharges high voltage at the outer circumference of the housing and applies high voltage to the coating material particles sprayed from the rotary atomizing head by the discharge from this external electrode.

[EXPLANATION OF REFERENCES]

| | |
|---|---|
| 1, 31 | Rotary atomizing head-type sprayer |
| 3 | Air motor |
| 4 | Rotary axis |
| 4A | Front |

-continued

| [EXPLANATION OF REFERENCES] | |
|---|---|
| 5 | Feed tube |
| 6 | Rotary atomizing head |
| 6B | Outer peripheral surface |
| 6C | Inner circumferential surface |
| 6D | Discharge edge |
| 6F | Front side portion |
| 7 | Shaping air ring |
| 7A | Inner cylinder surface |
| 7B | Front outer cylinder surface (outer cylinder surface) |
| 7E | Front end |
| 8 | First shaping air jetting unit |
| 9, 11, 21 | Second shaping air jetting unit |
| 34 | Shaping air controller |
| 41 | Electrostatic painting apparatus |
| 42 | High voltage generator |
| 43 | Painting robot (sprayer transport means) |
| 44 | Robot control (transport means control apparatus) |
| 45 | Object to be coated (painted) |
| 45A | Coating surface |
| a | Gap dimensions |
| b | Retraction dimensions |
| c | Width dimensions |
| α | Angle of the front side portion of the rotary atomizing head |
| β | Taper angle of the front outer cylinder surface |
| γ | Taper angle of the virtual taper surface |
| L | Coating distance |

The invention claimed is:

1. A rotary atomizing head-type sprayer that is equipped with an air motor powered by compressed air, a hollow rotary body that is rotatably supported along an axis line of said air motor in a front-back direction and of which a front end protrudes from said air motor, a feed tube extending through said rotary body to said front end of said rotary body, a rotary atomizing head that is mounted on said front end of said rotary body and that has an outer circumferential surface that expands into a cup shape and an inner circumferential surface that diffuses a coating material supplied from said feed tube, and a discharge edge located at a front end to discharge the coating material, a cylindrical shaping air ring provided on an outer circumferential side of said rotary atomizing head, and a first shaping air jetting unit mounted on the outer circumferential side of said rotary atomizing head to jet a first shaping air to the coating material discharged from said discharge edge, wherein an inner cylinder surface of said shaping air ring is formed of a uniform inner diameter at least on a front side portion facing said outer circumferential surface of said rotary atomizing head, said first shaping air jetting unit is formed as a ring gap between said outer circumferential surface of said rotary atomizing head and said inner cylinder surface of said shaping air ring, a gap dimension between said outer circumferential surface of said rotary atomizing head and said inner cylinder surface of said shaping air ring is set to 0.1 to 1.0 mm, a front end of said shaping air ring is positioned 0.1 to 10.0 mm from said discharge edge of said rotary atomizing head on a rear side, a radial width dimension of said front end of said shaping air ring is set to be less than 2 mm, and an outer cylinder surface of said shaping air ring has a taper angle of 25° or less in relation to said axis line, expanding from said front end to a rear side of said shaping air ring.

2. The rotary atomizing head-type sprayer as described in claim 1, wherein of said outer circumferential surface of said rotary atomizing head, a front side portion facing said inner cylinder surface of said shaping air ring has an angle of 0 to 10° in a direction of diameter reduction from said discharge edge on the rear side.

3. The rotary atomizing head-type sprayer as described in claim 1, wherein said shaping air ring is positioned on an outer side radially from said first shaping air jetting unit and surrounds said rotary atomizing head, and is equipped with a second shaping air jetting unit that jets a second shaping air toward the coating material discharged from said discharge edge, and said second shaping air jetting unit is positioned inside a virtual taper surface with a taper angle of 25° that expands from said front end on the rear side of said shaping air ring.

4. The rotary atomizing head-type sprayer as described in claim 3, wherein there is a shaping air control device for controlling an ejection amount of the first shaping air and an ejection amount of the second shaping air, and said shaping air controller controls a ratio of a discharge amount of said first shaping air to a discharge amount of said second shaping air such that a spray pattern of paint released from said rotary atomizing head will be smaller.

5. An electrostatic painting apparatus that is provided with a rotary atomized head sprayer as described in claim 1, that is characterized by the fact that there is a high voltage generator applying a high voltage to a paint that may be discharged from said rotary atomizing head, a sprayer transport means to which said rotary atomizing head sprayer may be attached, and a transport control device to control said sprayer transport means, wherein said transport control device will control said sprayer transport means such that a coating distance from the discharge edge to a coating surface to be painted is maintained at 90 to 150 mm.

* * * * *